J. W. HODGES.
Steam-Traps.
No. 143,761.  Patented Oct. 21, 1873.
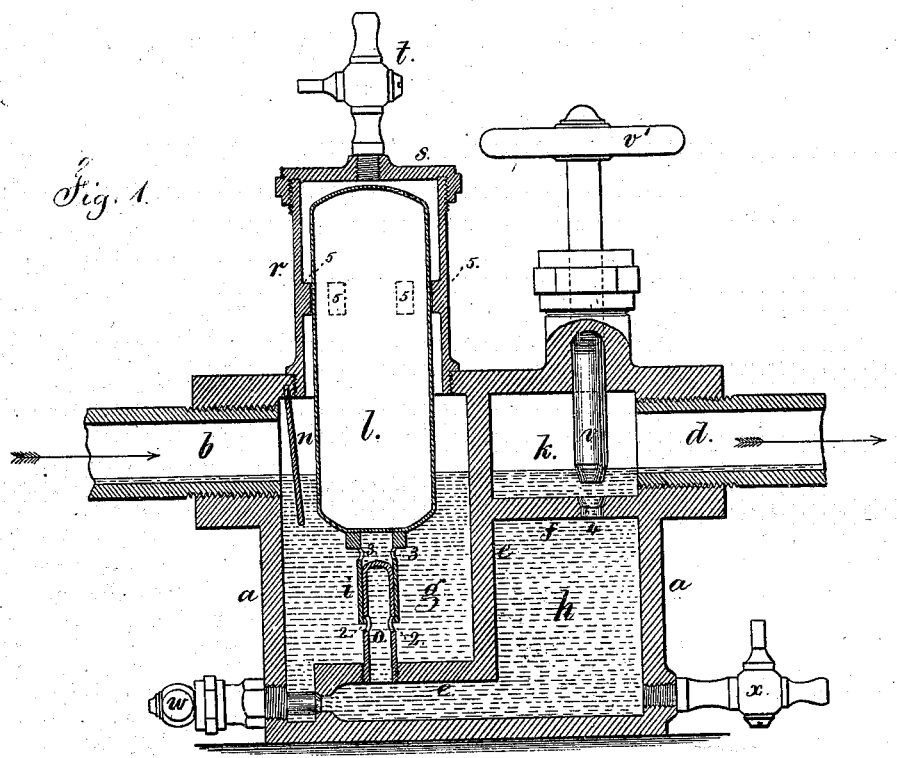
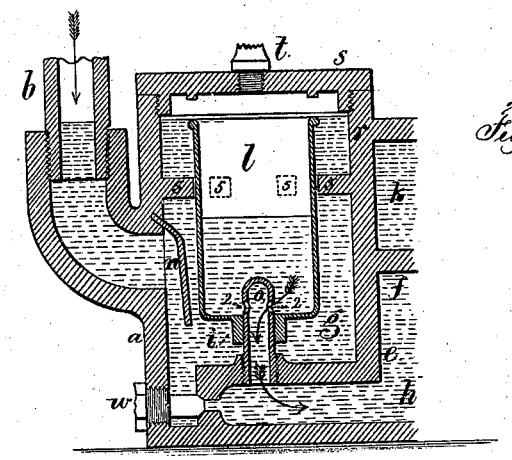

UNITED STATES PATENT OFFICE.

JAMES W. HODGES, OF NEW YORK, ASSIGNOR TO HIMSELF AND JOHN W. HARWAY, OF BAY SIDE, N. Y.

IMPROVEMENT IN STEAM-TRAPS.

Specification forming part of Letters Patent No. 143,761, dated October 21, 1873; application filed February 21, 1873.

*To all whom it may concern:*

Be it known that I, JAMES WILSON HODGES, of the city and State of New York, have invented an Improvement in Steam-Traps, of which the following is a specification:

Steam-traps have been made with a floating valve and a screw-plug, as may be seen in patent No. 114,141, granted to me.

My present invention relates to a tubular slide-valve operated by a float, and so balanced that it operates with equal freedom under any pressure. This slide-valve and float are applied in a metallic case that has screw-plugs or valves for regulating the speed of the discharge water of condensation, and for blowing out obstructions.

In the drawing, Figure 1 is a vertical section of the said trap, and Fig. 2 is a partial section of a modification of said apparatus.

The vessel $a$ is connected with the inlet-pipe $b$, through which the water of condensation flows, and the escape-pipe $d$ delivers the water from the case. Within the vessel $a$ are the partitions $e$ and $f$, dividing the space into the chambers $g$, $h$, and $k$. The float $l$ is in the chamber $g$, that receives the water of condensation from the pipe $b$, and a deflector, $u$, checks the force of the water and prevents it striking the float. The tubular valve $i$ surrounds the tubular seat $o$. In the tube $o$ are discharge-openings 2, and in the tube $i$ are openings 3, that admit steam or water between the closed end of the tube $o$ and the float $l$, so as to equalize pressure and allow the float to rise and fall freely by the change of water-level in the chamber $g$. As the water runs into this chamber $g$, the float $l$ rises, and its tubular valve $i$ uncovers the holes 2 in $o$, and allows the water to be ejected by the pressure into the chamber $h$, and escape by the opening 4 in the partition $f$, and flow away by the pipe $d$. As the water-level in $g$ descends, and with it the float $l$, the openings 2 are covered and the further flow of water stopped until the float rises again. The float $l$ is guided at 5 in the cap $r$, and at the top is the cover $s$ and escape-air cock $t$, which latter may be employed, if desired. The screw-plug $v$, applied to the hole 4 in the partition $e$, and operated by the hand-wheel $v'$, serves to arrest the operation of the apparatus when desired, or regulate the escape of the water of condensation. The screw-plug $w$ and blow-off cock $x$ serve to empty the trap or blow off sediment when required.

In Fig. 2 corresponding parts are shown, and the operations are the same, except that the float is made as an open vessel and the delivery of the water of condensation takes place through it. In the position shown, the water is blowing off through the openings 2 in the tubular seat $o$, and, as soon as sufficient weight of water has passed out of the float to allow it to rise, the tube $i$ acts as a valve to close the openings 2, until a further rise in the water causes it to flow over the edge of the float and sink the same, and the operations are repeated.

I claim as my invention—

1. The openings 3 in the tube $i$ above the tubular seat $o$, in combination with the tubular seat $o$, openings $h$, float $l$, and chamber $g$, substantially as set forth.

2. The arrangement of the partitions $e f$ in the vessel $a$, to form the chambers $g h k$, in combination with the stop-plugs $v w$, and blow-off cock $x$, float $l$, and tubular valve $i$, substantially as set forth.

Signed by me this 13th day of February, A. D. 1873.

J. W. HODGES.

Witnesses:
GEO. T. PINCKNEY,
CHAS. H. SMITH.